(12) United States Patent
Caron Kardos et al.

(10) Patent No.: US 10,413,790 B2
(45) Date of Patent: Sep. 17, 2019

(54) HOCKEY BLADE WITH PIN-REINFORCED CORE

(71) Applicant: Bauer Hockey Ltd., Blainville (CA)

(72) Inventors: Jean-Frédérik Caron Kardos, Lorraine (CA); Mathieu Ducharme, Prevost (CA)

(73) Assignee: Bauer Hockey, LLC, Exeter, NH (US)

( * ) Notice: Subject to any disclaimer, the term of this patent is extended or adjusted under 35 U.S.C. 154(b) by 0 days.

(21) Appl. No.: 16/148,613

(22) Filed: Oct. 1, 2018

(65) Prior Publication Data

US 2019/0030408 A1    Jan. 31, 2019

Related U.S. Application Data

(62) Division of application No. 15/280,603, filed on Sep. 29, 2016, now Pat. No. 10,099,100.

(51) Int. Cl.

| | |
|---|---|
| *A63B 59/70* | (2015.01) |
| *B29C 63/00* | (2006.01) |
| *B29C 63/02* | (2006.01) |
| *B29C 70/86* | (2006.01) |
| *B29C 70/08* | (2006.01) |
| *B29C 70/24* | (2006.01) |
| *B29L 31/52* | (2006.01) |
| *A63B 102/24* | (2015.01) |

(52) U.S. Cl.
CPC .......... *A63B 59/70* (2015.10); *B29C 63/0004* (2013.01); *B29C 63/0073* (2013.01); *B29C 63/02* (2013.01); *B29C 70/086* (2013.01); *B29C 70/24* (2013.01); *B29C 70/865* (2013.01); *A63B 2102/24* (2015.10); *A63B 2209/00* (2013.01); *A63B 2209/02* (2013.01); *A63B 2209/023* (2013.01); *B29K 2715/003* (2013.01); *B29L 2031/52* (2013.01)

(58) Field of Classification Search
CPC .. A63B 59/70; A63B 2102/24; A63B 2102/22
USPC .................................................. 473/560–563
See application file for complete search history.

(56) References Cited

U.S. PATENT DOCUMENTS

| | | |
|---|---|---|
| 4,488,721 A | 12/1984 | Franck et al. |
| 5,078,396 A | 1/1992 | Cavallaro et al. |

(Continued)

FOREIGN PATENT DOCUMENTS

| | | |
|---|---|---|
| WO | 9716303 A1 | 5/1997 |
| WO | 2012045814 A1 | 4/2012 |
| WO | 2016066657 A1 | 5/2016 |

OTHER PUBLICATIONS

Pegorin et al., Delamination Fatigue Properties of Z-Pinned Carbon-Epoxy Laminate Using Metal or Composite Rods, 20th International Conference on Composite Materials, Copenhagen, Jul. 2015, 12 pages.

(Continued)

*Primary Examiner* — Mark S Graham
(74) *Attorney, Agent, or Firm* — Banner & Witcoff, Ltd.

(57) ABSTRACT

A construct for a hockey blade that includes a foam core. The foam core includes a first core face, a second core face, and a bottom core edge and a top core edge. Multiple pins are injected into the foam core, and one or more layers of resin preimpregnated tape are wrapped around the foam before forming a hockey blade structure in a heated mold.

6 Claims, 13 Drawing Sheets

(56) References Cited

U.S. PATENT DOCUMENTS

| | | | |
|---|---|---|---|
| 5,407,195 | A | 4/1995 | Tiitola et al. |
| 5,589,015 | A | 12/1996 | Fusco et al. |
| 6,062,996 | A | 5/2000 | Quigley et al. |
| 7,008,338 | B2 | 3/2006 | Pearson |
| 7,963,868 | B2 | 6/2011 | McGrath et al. |
| 10,099,100 | B2 * | 10/2018 | Caron Kardos ....... A63B 59/70 |
| 2003/0098520 | A1 | 5/2003 | Cournoyer et al. |
| 2004/0121138 | A1 | 6/2004 | Carstensen |
| 2009/0233741 | A1 | 9/2009 | Gans |
| 2015/0045154 | A1 | 2/2015 | Pearson et al. |
| 2015/0165722 | A1 | 6/2015 | Yasaee et al. |

OTHER PUBLICATIONS

Lander, James K., "Designing with Z-Pins: Locally Reinforced Composite Structures," School of Applied Science, Cranfield University, Nov. 2008, 308 pages.

Jan. 8, 2018—(WO) International Search Report and Written Opinion—App. No. PCT/US2017/053985.

* cited by examiner

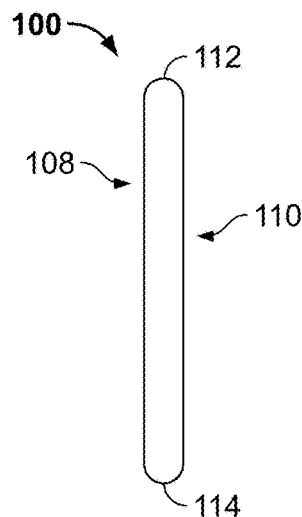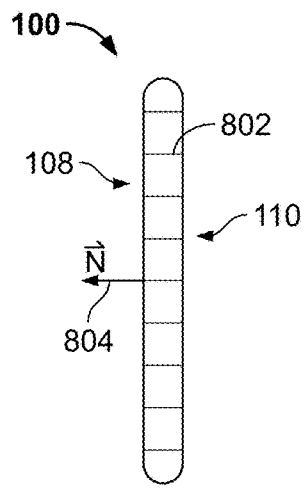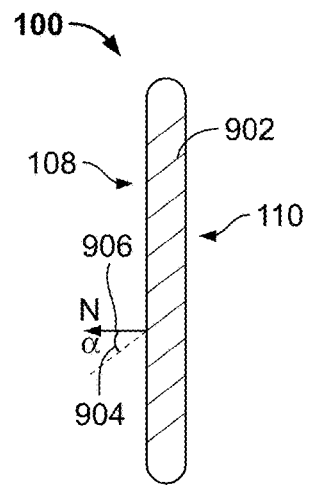
FIG. 7    FIG. 8    FIG. 9
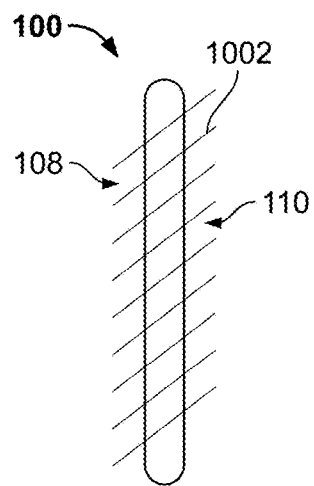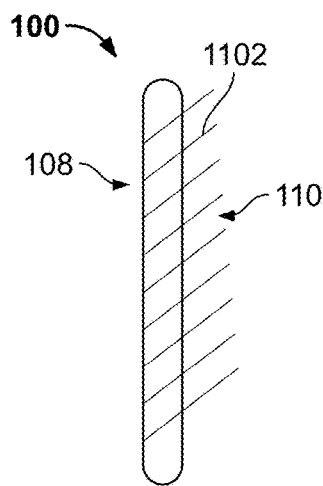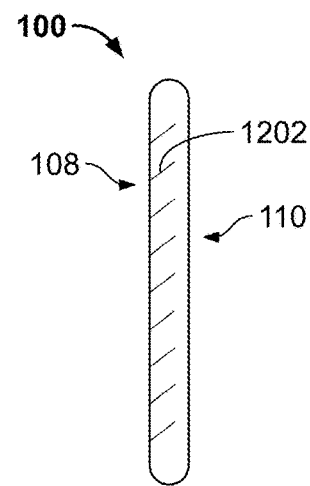
FIG. 10    FIG. 11    FIG. 12

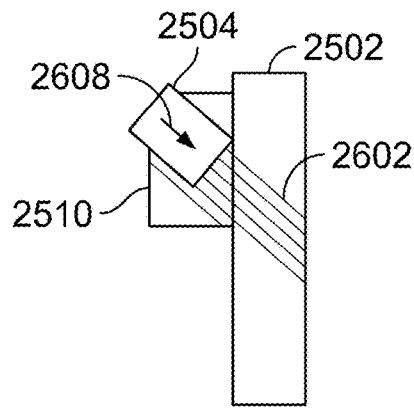
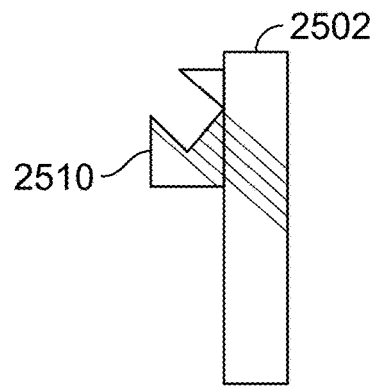
FIG. 26B  FIG. 26C
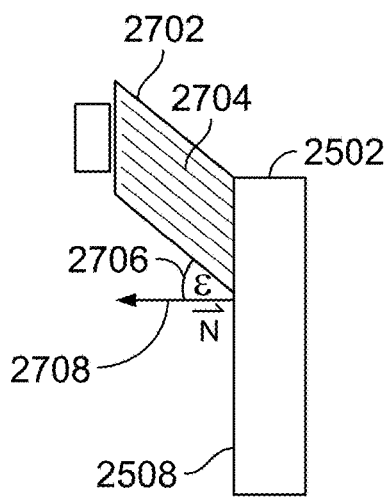
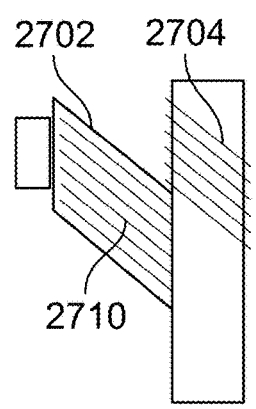
FIG. 27A  FIG. 27B

HOCKEY BLADE WITH PIN-REINFORCED CORE

CROSS-REFERENCE TO RELATED APPLICATIONS

This application is a divisional of U.S. patent application Ser. No. 15/280,603, filed Sep. 29, 2016, which is incorporated herein by reference in its entirety for any and all non-limiting purposes.

FIELD

This disclosure relates generally to fabrication of molded structures. More particularly, aspects of this disclosure relate to hockey blades molded from foam that is reinforced with fiber pins and wrapped with one or more layers of tape.

BACKGROUND

Hockey stick blades may be made of a core that is reinforced with one or more layers of synthetic materials, such as fiberglass, carbon fiber or Aramid. Aspects of this disclosure relate to improved methods for production of a reinforced hockey stick blade core.

SUMMARY

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Aspects of the disclosure herein may relate to fabrication of a formed hockey blade structure. In one example, the formed hockey blade structure may include a fiber-pin-reinforced foam core. The fabrication of the formed hockey blade structure may include forming a foam core, injecting fiber pins into a first core face of the foam core, with the fiber pins extending between the first core face and a second core face. Additionally, the foam core may be wrapped with a layer of fiber tape, the wrapped foam core may be positioned within a mold, which is heated and cooled to produce a formed hockey blade structure.

BRIEF DESCRIPTION OF THE DRAWINGS

The present disclosure is illustrated by way of example and not limited in the accompanying figures in which like reference numerals indicate similar elements and in which:

FIG. 7 schematically depicts a cross-sectional view of the foam core of FIG. 1, according to one or more aspects described herein.

FIG. 8 schematically depicts another cross-sectional view of the foam core of FIG. 1, and including multiple pins injected into the foam core of FIG. 1, according to one or more aspects described herein.

FIG. 9 schematically depicts another cross-sectional view of the foam core of FIG. 1, including multiple pins injected into the foam core of FIG. 1 at an angle relative to a surface normal of a first core face, according to one or more aspects described herein.

FIG. 10 schematically depicts another cross-sectional view of the foam core of FIG. 1 having multiple pins extending beyond a first core face and a second core face, according to one or more aspects described herein.

FIG. 11 schematically depicts another cross-sectional view of the foam core of FIG. 1 having multiple pins injected into the foam core of FIG. 1, and extending from an injection surface through to, and out beyond, an opposing surface of a second core face, according to one or more aspects described herein.

FIG. 12 schematically depicts another cross-sectional view of the foam core of FIG. 1 with multiple pins injected into a first core face, and extending into the foam core, without extending through to a second core face, according to one or more aspects described herein.

FIGS. 26A-26C schematically depict another implementation of a method for injecting multiple pins into a foam core at a non-zero angle relative to an injection surface, according to one or more aspects described herein.

FIGS. 27A and 27B schematically depict a pin injector that may be utilized to inject pins into a foam core without using a guide foam structure, according to one or more aspects described herein.

Further, it is to be understood that the drawings may represent the scale of different component of one single embodiment; however, the disclosed embodiments are not limited to that particular scale.

DETAILED DESCRIPTION

In the following description of various example structures, reference is made to the accompanying drawings, which form a part hereof, and in which are shown by way of illustration various embodiments in which aspects of the disclosure may be practiced. Additionally, it is to be understood that other specific arrangements of parts and structures may be utilized, and structural and functional modifications may be made without departing from the scope of the present disclosures. Also, while the terms "top" and "bottom" and the like may be used in this specification to describe various example features and elements, these terms are used herein as a matter of convenience, e.g., based on the example orientations shown in the figures and/or the orientations in typical use. Nothing in this specification should be construed as requiring a specific three-dimensional or spatial orientation of structures in order to fall within the scope of this invention.

Aspects of this disclosure relate to systems and methods for production of a pin-reinforced hockey stick blade by injecting one or more pin elements into a core structure of the hockey stick blade. Aspects of this disclosure may also be applied to pin-reinforcement of a hockey stick shaft, among others.

Figure 1:
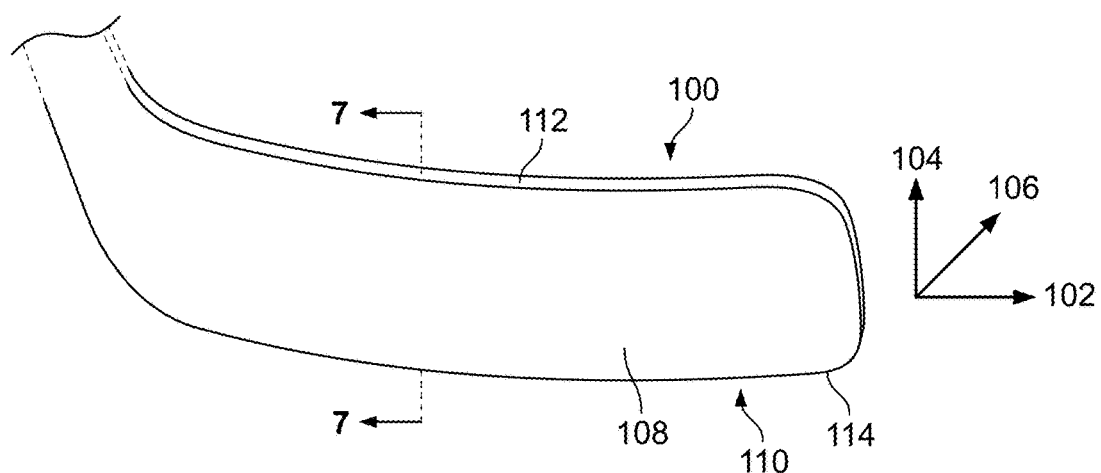
FIG. 1 schematically depicts a perspective view of a foam core, according to one or more aspects described herein.

FIG. 1 schematically depicts a perspective view of a foam core 100. In particular, the foam core 100 is embodied with the geometry of a hockey stick blade. It is contemplated, however, that the foam core 100 may, additionally or alternatively, be shaped with the geometry of a hockey stick shaft, without departing from the scope of these disclosures. In certain examples, foam core 100 may be a polymethacrylimide (PMI) foam. In one specific example, a Resin Infusion Manufacturing Aid (RIMA) low density PMI foam may be utilized in the foam core 100. This type of foam is a high strength foam that can withstand the shear and impact forces that result when a hockey blade strikes a hockey puck. However, it is contemplated that additional or alternative foam materials may be utilized to construct the foam core 100, without departing from the scope of these disclosures. In an alternative example, the foam core 100 may be removed following one or more molding processes of the hockey stick blade. As such, the blade structure may be formed of composite structures; carbon fiber walls that are reinforced by pins and molded with epoxy. In this alternative example, the foam may be removed by one or more mechanical processes (one or more machine tools may be utilized to remove the foam core 100, chemical processes (the foam may be degraded/dissolved by the addition of/exposure to a reactant/catalyst/solvent.

The foam core 100, as embodied in FIG. 1 with the geometry of a hockey stick blade, has a longitudinal length that is approximately parallel to the depicted axis 102 (otherwise referred to as the x-direction 102, and/or the x-axis 102). Further, the hockey stick blade foam core 100 has a height approximately parallel to the depicted axis 104 (otherwise referred to as the y-direction 104, and/or the y-axis 104), and a depth that is approximately parallel to the depicted axis 106 (otherwise referred to as the z-direction 106, and/or the z-axis 106). Further, the hockey stick blade foam core 100 includes a first core face 108, a second core face 110, a top core edge 112, and a bottom core edge 114.

The hockey stick blade foam core 100, as depicted in FIG. 1, includes an outline of a handle, or shaft portion shown in dashed lines to illustrate how the foam core 100, once ultimately formed into a blade, as described in this specification, is configured as part of a hockey stick that includes a blade and a handle, or shaft.

Figure 2:
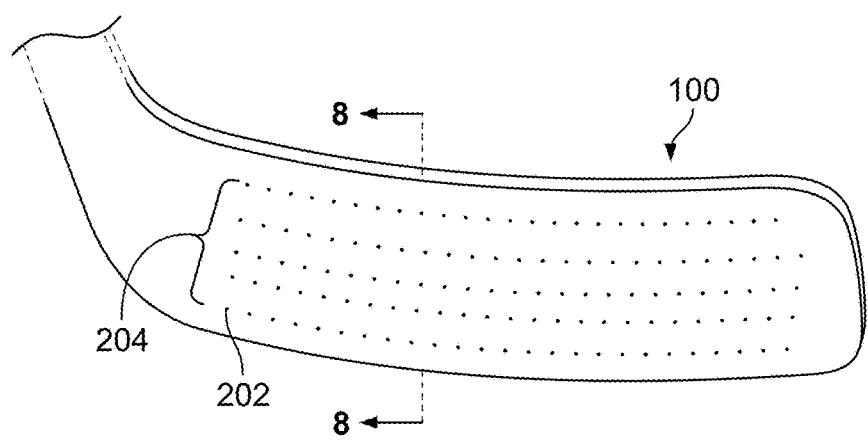
FIG. 2 schematically depicts an isometric view of the foam core of FIG. 1, and including an array of regularly-spaced pins that have been injected into the foam core, according to one or more aspects described herein.

FIG. 2 schematically depicts an isometric view of the foam core 100 that includes an array 204 of regularly spaced pins that have been injected into the foam core 100. Pin 202 is labelled as one example pin within the array 204 of pins injected into the foam core 100. However, pin 202 may or may not be substantially identical in shape, size, orientation, and/or injection depth, to one or more of the pins within the array 204. As such, the array 204 may include pins of differing geometries and configurations, or approximately uniform pins, without departing from the scope of these disclosures. Further, the array 204 may include any number of pins, without departing from the scope of these disclosures. The regular spacing, otherwise referred to as even spacing, between the pins of array 204 may measure any length. Additionally, a first spacing may be equal to a first length along a first axis of the array 204 (e.g. along that axis approximately parallel to axis 102), and a second spacing may be equal to a second length along a second axis of the array 204 (e.g. along that axis approximately parallel to axis 104). Further, while the regularly spaced array 204 is depicted with perpendicular axes approximately parallel to axes 102 and 104, it is contemplated that the array 204 may have any orientation, without departing from the scope of these disclosures. Additionally, array 204 represents one example of a regularly-spaced array of pins, which may otherwise be referred to as a pattern of pins. As such, it is contemplated that additional or alternative patterns of pin injection positions on the foam core 100 may be utilized, without departing from the scope of these disclosures.

Advantageously, the array of pins 204 may be utilized to provide improved strength and/or rigidity to a hockey stick blade that will, ultimately, be constructed from the foam core 100, according to the systems and methods described in the proceeding disclosures. As such, the array of pins 204 may be generally utilized to reinforce the foam core 100. The pins (e.g. pin 202), may be constructed from a fiber material (e.g. a synthetic fiber). In one example, the pins are constructed from carbon fiber. In another example, additional or alternative fibers (e.g. glass fiber, Aramid fiber, or metallic pins (e.g. titanium, steel) among others) may be utilized to construct the pins. As such, the pins may be generally referred to as fiber pins. The pins may, additionally or alternatively, be constructed from one or more polymeric, metallic or alloy, and/or organic materials, without departing from the scope of these disclosures. In one implementation, the pins may be utilized to provide structural bridging elements between the outer faces of the hockey blade, once molded. In certain examples, pins may be injected with different pin densities/pin injection densities into, in one example, the foam core 100. In one implementation, a pin injection density may be expressed as a number of pins per unit area of the foam core 100 into which the pins are injected. In another implementation, a pin injection density may be expressed as a percentage in volume content of an overall volume of the foam core structure into which the pins are injected. In yet another implementation, a pin injection density may be expressed as an areal weight. It is contemplated that any pin injection density may be utilized, without departing from the scope of these disclosures. In certain specific examples, a pin injection density expressed as a 0.5-5% volume content of the foam core may be utilized. In another example, a pin injection density with a 5%-25% areal weight may be utilized.

In one example, the injected pins may be constructed from fiber (e.g. carbon fiber) that is coated in epoxy resin, or another adhesive type. In this example, the epoxy may be configured to melt, adhere to surrounding structures, and re-solidify during one or more stages of a molding process, as described in the following disclosures. It is contemplated that the pins may have a substantially cylindrical or prismal geometry. In one implementation, the pins may be shaped with opposing pointed and dull ends, or with two opposing pointed ends, among others. It is contemplated that the pins may have a cylindrical diameter of approximately 0.2-0.4 mm. However, it is further contemplated that any pin dimensions, geometries and/or densities may be utilized, without departing from the scope of these disclosures. Further, it is contemplated that the pins may have irregular geometries, without departing from the scope of these disclosures.

Figure 3:
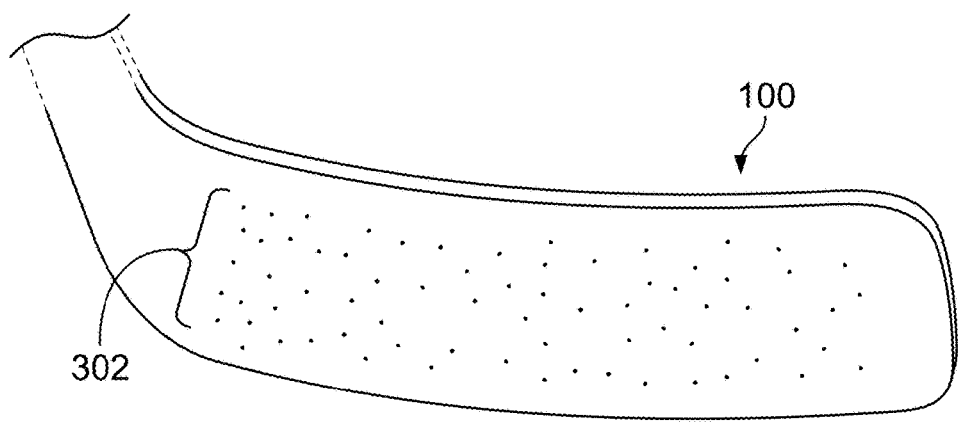
FIG. 3 schematically depicts an isometric view of the foam core of FIG. 1, and including an array of irregularly-spaced pins that have been injected into the foam core, according to one or more aspects described herein.

In another implementation, and as schematically depicted in FIG. 3, pins may be injected into the foam core 100 in a random, or pseudo-random manner, as depicted by the grouping of pins 302. As such, there may be no regularity, or pattern to the pins within grouping 302.

Figure 4:
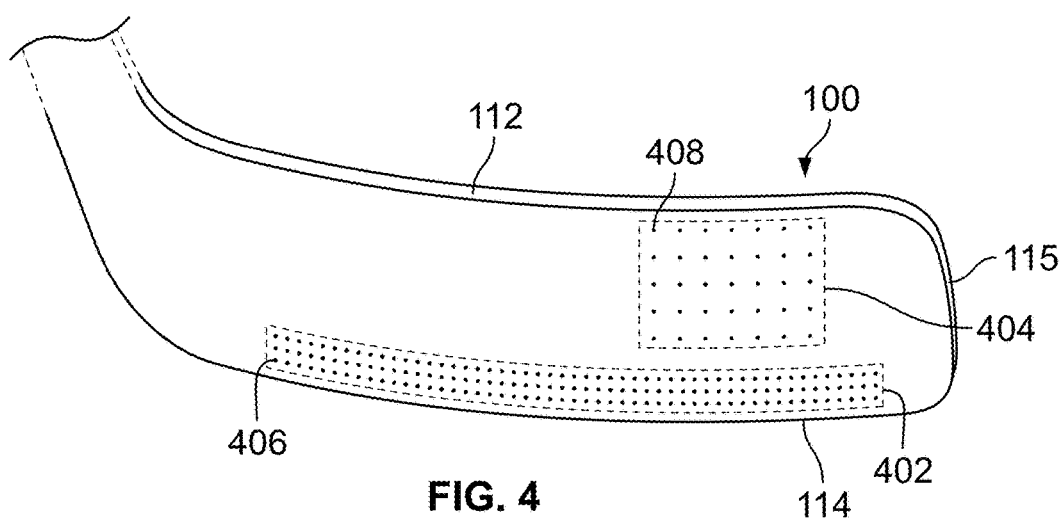
FIG. 4 schematically depicts another isometric view of the foam core of FIG. 1 with multiple pin injection areas for regularly spaced pins, according to one or more aspects described herein.

In other examples, pins may be injected into specific areas of the foam core 100 in order to selectively enhance the structural performance (e.g. strength and/or rigidity) of the hockey stick blade in areas likely to be subject to comparatively larger forces during use of the hockey stick. FIG. 4 schematically depicts another isometric view of the foam core 100 with multiple schematically-depicted pin injection areas 402 and 404. Area 402 includes an array of patterned pins (regularly-spaced pins, of which pin 406 is one example pin) injected into the foam core 100 with a first injection density. Further, area 404 includes an array of patterned pins, of which pin 408 is one example pin, injected into the foam core 100 with a second injection density. In this exemplary embodiment, the spacing between the pins within area 404 may be larger than the spacing between the pins within area 402. As such, area 402 may be referred to as having a higher injection density than area 404. It is noted that the positions of areas 402 on 404 are merely one example. As such, any shape of pin injection areas may be utilized, and any number of pin injection areas on a single foam core 100 may be utilized, without departing from the scope of these disclosures. In one specific implementation, one or more areas proximate the bottom core edge 114, top core edge 112, and/or toe core edge 115 may utilize a comparatively higher pin injection density in order to provide increased resistance to wear and/or fracture of the hockey stick blade at or close to these areas. In another specific implementation, areas proximate one or more preferred impact areas on the hockey blade (preferred for making contact with a hockey puck during a shot motion), may utilize a comparatively higher pin injection density.

Figure 5:
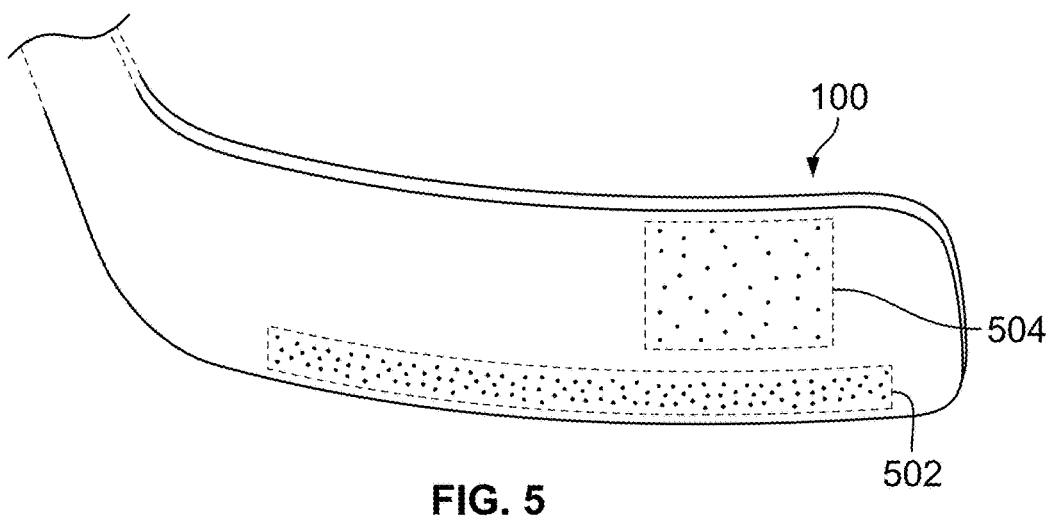
FIG. 5 schematically depicts another isometric view of the foam core of FIG. 1 with multiple pin injection areas for irregularly spaced pins, according to one or more aspects described herein.
Figure 6:
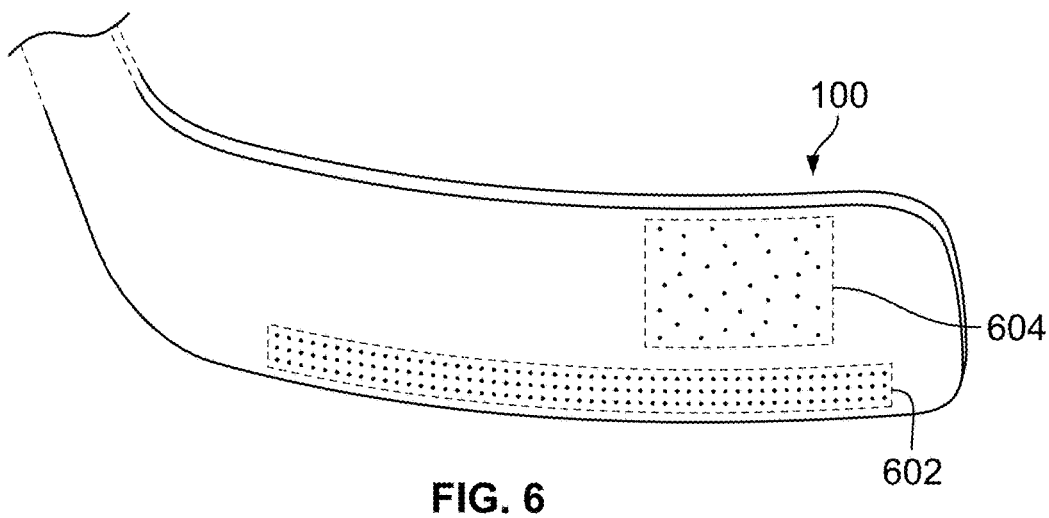
FIG. 6 schematically depicts an isometric view of the foam core of FIG. 1 with a first area of regularly spaced pins, and a second area of irregularly spaced pins, according to one or more aspects described herein.

In another implementation, one or more areas of the foam core 100 may be delimited for injection of pins with random, or irregular spacing, as schematically depicted in FIG. 5 by areas 502 and 504. As such, in one example, area 502 is depicted with a first group of irregularly-spaced pins injected with a first injection density (e.g. a first average separation between pin injection positions on a surface of the foam core 100), and area 504 is depicted with a second group of irregularly-spaced pins injected with a second injection density (e.g. a second average separation between pin injection positions on the surface of the foam core 100). In another implementation, multiple areas of the foam core 100 may be delimited for injection with pins having a combination of regular and irregular spacing. For example, FIG. 6 schematically depicts an isometric view of the foam core 100 with a first area 602 of regularly-spaced/patterned pins, and a second area 604 of irregularly/randomly-spaced pins.

FIG. 7 schematically depicts a cross-sectional view of the foam core 100 along line 7-7 from FIG. 1. It is noted that the cross-sectional view of FIG. 7 is merely one example of a cross-sectional geometry of the foam core 100, and alternative geometries may be utilized, without departing from the scope of these disclosures. FIG. 8 schematically depicts another cross-sectional view of the foam core 100, and including multiple pins, of which pin 802 is one example pin, injected into the foam core 100. In one implementation, the cross-sectional view of FIG. 8 is along the line 8-8 from FIG. 2, such that the pins depicted in FIG. 8 are part of the array 204. As depicted in FIG. 8, the pins may extend from the first core face 108 to the second core face 110. In one implementation, the pins in FIG. 8 may be injected into the foam core 100 at an angle relative to a surface normal 804 on the first core face 108. In the example of FIG. 8, the pins may be injected as an angle of approximately 0° relative to the surface normal 804. In another implementation, pins may be injected into the foam core 100 at a non-zero angle relative to the surface normal on the first core face 108. FIG. 9 schematically depicts another implementation, including multiple pins, of which pin 902 is one example pin, injected into the foam core 100 at an angle α 904 relative to a surface normal 906 on the first core face 108. It is contemplated that the angle α 904 may have a range of 5°-85°, 10°-80°, 15°-75°, 20°-70°, 25°-65°, 30°-60°, 35°-55°, 40°-50°, or approximately 45°, among others.

In one example, when injected into the foam core 100, the pins may extend out beyond the outer surfaces of the first core face 108 and second core face 110. In this regard, FIG. 10 schematically depicts another cross-sectional view of the foam core 100 having multiple pins, of which pin 1002 is one example pin, extending beyond the first core face 108 and the second core face 110. In one example, a portion of one or more pins extending out from one or more of the first core face 108 and the second core face 110 may be configured to embed into, one or more layers of fiber tape that may be applied over the pin-injected foam core 100. In another example, a portion of one or more pins extending out from one or more of the first core face 108 and the second core face 110 may be removed by one or more additional processes (e.g. cutting, grinding etc.).

FIG. 11 schematically depicts another cross-sectional view of the foam core 100 having multiple pins, of which pin 1102 is one example pin, injected into the foam core 100, and extending from the injection surface 108 through to, and out beyond the opposing surface of the second core face 110. It is contemplated that, in another implementation, the second core face 110 may be the injection surface in FIG. 11, such that when injected into the foam core 100, the pins (e.g. pin 1102) extend through to the first core face 108, and project out from the second core face 110.

FIG. 12 schematically depicts another cross-sectional view of the foam core 100 with multiple pins, of which pin 1202 is one example pin, injected into the first core face 108, and extending into the foam core 100, without extending through to the second core face 110. In one example, the pins (e.g. pin 1202) may extend to an approximate uniform depth into the foam core 100. In another example, the pins (e.g. pin 1202) may extend into the foam core 100 to differing depths.

Figure 13:
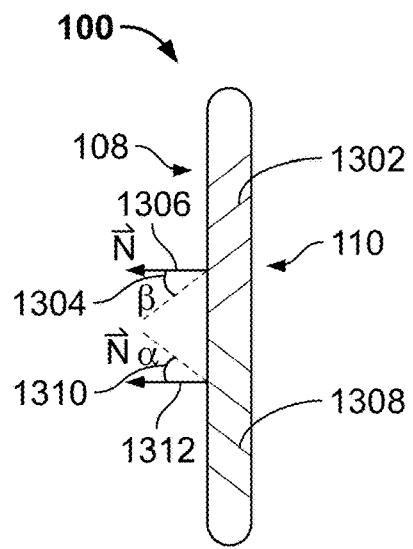
FIG. 13 schematically depicts another cross-sectional view of the foam core of FIG. 1 having pins injected at different angles, according to one or more aspects described herein.

In another implementation, pins may be injected into the foam core 100 at different angles in different sections of the blade. In this regard, FIG. 13 schematically depicts another cross-sectional view of the foam core 100 having pins injected at different angles in two different sections. In particular, FIG. 13 schematically depicts a first set of pins, of which pin 1302 is one example pin, injected at a first angle β 1304 relative to a first surface normal 1306 on the first core face 108, and a second set of pins, of which pin 1308 is one example pin, injected at a second angle γ 1310 relative to a second surface normal 1312 on the first core face 108. It is also contemplated, however, that the core could be provided with additional sections having additional sets of pins at different angles.

Figure 14:
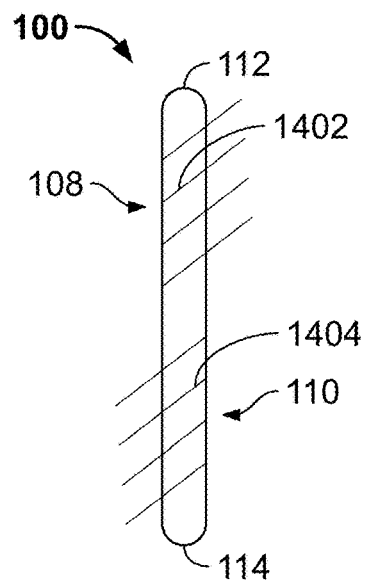
FIG. 14 schematically depicts another cross-sectional view of the foam core of FIG. 1 having a first set of pins injected into a first core face, and a second set of pins, injected into a second core face, according to one or more aspects described herein.

It is further contemplated that pins may be injected into multiple surfaces of the foam core 100. For example, FIG. 14 schematically depicts another cross-sectional view of the foam core 100 having a first set of pins, of which pin 1402 is one example pin, injected into the first core face 108, and a second set of pins, of which pin 1404 is one example pin, injected into the second core face 110. It is contemplated that pins may be injected into additional or alternative faces of the foam core 100, without departing from the scope of these disclosures. For example, one or more pins may be injected into the top core edge 112 and/or the bottom core edge 114, without departing from the scope of these disclosures.

Figure 15:
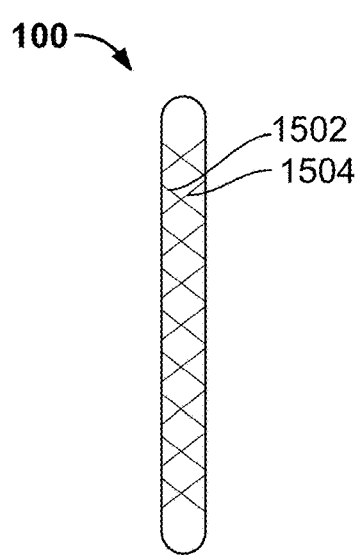
FIG. 15 schematically depicts another cross-sectional view of the foam core of FIG. 1 having multiple pins injected into the foam core at angles resulting in an overlapping pattern of pins, according to one or more aspects described herein.

In yet another example, pins may be injected into the foam core 100 in an overlapping configuration. FIG. 15 schematically depicts another cross-sectional view of the foam core 100 having multiple pins, of which pins 1502 and 1504 are exemplary pins, injected into the foam core 100 at angles resulting in an overlapping pattern of pins, as depicted FIG. 15. In particular, the pins may abut, or be positioned close to one another within the foam core 100 when in the overlapping pattern depicted in FIG. 15. The overlapping pins of FIG. 15, of which pins 1502 and 1504 are examples, may be utilized to provide reinforcing structures along multiple directions. In one example, one or more of a group of pins injected at different angles (e.g. the pins of FIG. 15) may resist shear forces within the hockey stick blade when molded. As such, the one or more of the group of injected pins may be angled such that they will fail by being pulled out of the foam core 100, rather than failing by shearing. This pullout failure mode absorbs more energy than those pins angled such that they will fail by shearing, and thereby offers more strength to the hockey blade before the blade will fail (fracture etc.)

It is further contemplated that combinations of the pin injection methodologies discussed in relation to FIGS. 8-15 may be utilized, without departing from the scope of these disclosures. Additionally, it is noted that the pin injection methodologies discussed in relation to FIGS. 8-15 are a limited selection of possible pin injection methodologies, and additional or alternative pin injection patterns may be utilized, without departing from the scope of these disclosures.

Figure 16:
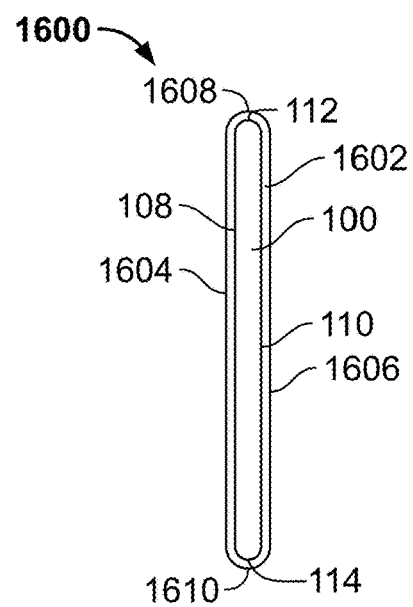
FIG. 16 schematically depicts a cross-sectional view of a wrapped foam core, according to one or more aspects described herein.

In one implementation, and as described in relation to FIGS. 7-15, multiple pins may be injected into an uncovered foam core 100. In another implementation, the foam core 100 may be wrapped with one or more layers of carbon fiber tape prior to injection of the pins. The carbon tape may, in one example, be preimpregnated with epoxy resin, or another adhesive material, which may be molded during one or more processing stages described in the proceeding disclosures. In one implementation, the carbon fiber tape may be wrapped continuously around the foam core 100. Accordingly, FIG. 16 schematically depicts a cross-sectional view of a wrapped foam core 1600 that includes one or more layers of carbon fiber tape 1602 wrapped around the foam core 100. In one implementation, the one or more layers of carbon fiber tape 1602 may be continuously wrapped around the first core face 108, the top core edge 112, the second core face 110, and the bottom core edge 114, resulting in a first wrapped face 1604, a second wrapped face 1606, a top wrapped edge 1608, and a bottom wrapped edge 1610. In another implementation, it is contemplated that the wrapped foam core 1600 may, additionally or alternatively, utilize one or more discontinuous lengths of carbon fiber tape, without departing from the scope of these disclosures.

Figure 17:
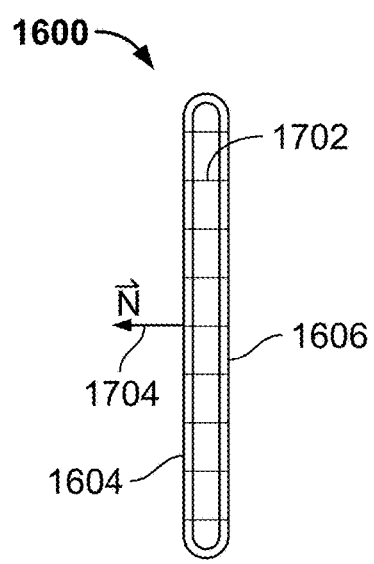
FIG. 17 schematically depicts a cross-sectional view of the wrapped foam core of FIG. 16, and including multiple pins injected into the wrapped foam core, according to one or more aspects described herein.

FIGS. 17-24 utilize similar pin injection methodologies to those discussed in relation to FIGS. 8-15, respectively, and include the wrapped foam core 1600 in place of the foam core 100. As such, FIG. 17 schematically depicts a cross-sectional view of the wrapped foam core 1600, and including multiple pins, of which pin 1702 is one example pin, injected into the wrapped foam core 1600. As depicted in FIG. 17, the pins may extend from the first wrapped core face 1604 to the second core face 1606. In one implementation, the pins in FIG. 17 may be injected into the wrapped foam core 1600 at an angle relative to a surface normal 1704 on the first wrapped core face 1604. In the example of FIG. 17, the pins may be injected at an angle of approximately 0° relative to the surface normal 1704.

Figure 18:
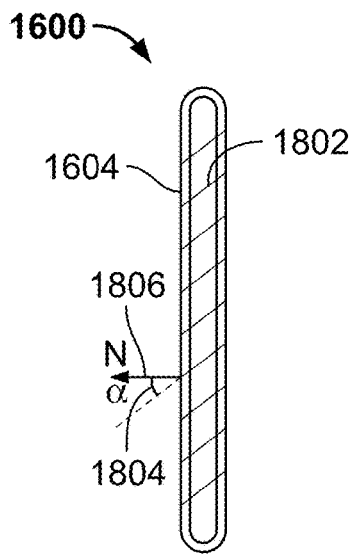
FIG. 18 schematically depicts another cross-sectional view of the wrapped foam core of FIG. 16, including multiple pins injected into the wrapped foam core at an angle relative to a surface normal on a first wrapped core face, according to one or more aspects described herein.

FIG. 18 schematically depicts another implementation, including multiple pins, of which pin 1802 is one example pin, injected into the wrapped foam core 1600 at an angle α 1804 relative to a surface normal 1806 on the first wrapped core face 1604.

Figure 19:
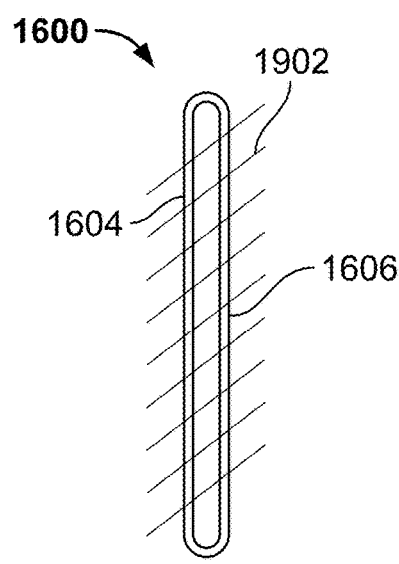
FIG. 19 schematically depicts another cross-sectional view of the wrapped foam core of FIG. 16 having multiple pins extending beyond a first wrapped core face and a second wrapped core face, according to one or more aspects described herein.

FIG. 19 schematically depicts another cross-sectional view of the wrapped foam core 1600 having multiple pins, of which pin 1902 is one example pin, extending beyond the first wrapped core face 1604 and the second wrapped core face 1606.

Figure 20:
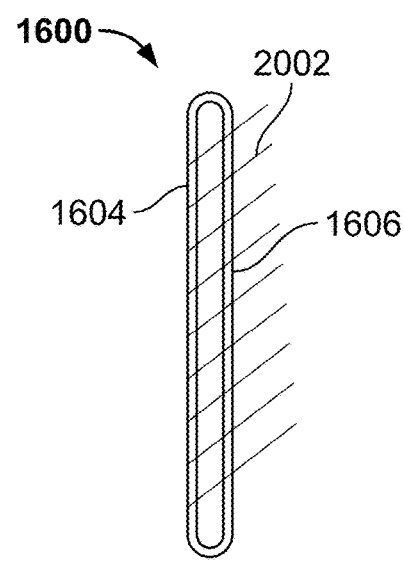
FIG. 20 schematically depicts a cross-sectional view of the wrapped foam core of FIG. 16 having multiple pins injected into the wrapped foam core, and extending from an injection surface through to, and out beyond an opposing surface of the second wrapped core face, according to one or more aspects described herein.

FIG. 20 schematically depicts a cross-sectional view of the wrapped foam core 1600 having multiple pins, of which pin 2002 is one example pin, injected into the wrapped foam core 1600, and extending from the injection surface (first wrapped core face) 1604 through to, and out beyond the opposing surface of the second wrapped core face 1606.

Figure 21:
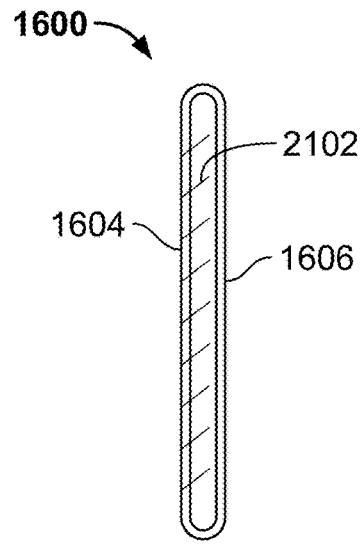
FIG. 21 schematically depicts another cross-sectional view of the wrapped foam core of FIG. 16 with multiple pins injected into a first wrapped core face, and extending into the wrapped foam core without extending through to a second wrapped core face, according to one or more aspects described herein.

FIG. 21 schematically depicts another cross-sectional view of the wrapped foam core 1600 with multiple pins, of which pin 2102 is one example pin, injected into the first wrapped core face 1604, and extending into the wrapped foam core 1600, without extending through to the second wrapped core face 1606.

Figure 22:
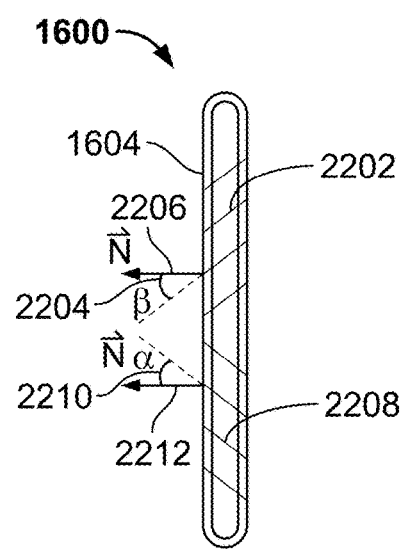
FIG. 22 schematically depicts a first set of pins injected at a first angle relative to a first surface normal on the first wrapped core face, and a second set of pins injected at a second relative to a second surface normal on a first wrapped core face, according to one or more aspects described herein.

FIG. 22 schematically depicts a first set of pins, of which pin 2202 is one example pin, injected at a first angle β 2204 relative to a first surface normal 2206 on the first wrapped core face 1604, and a second set of pins, of which pin 2208 is one example pin, injected at a second angle γ 2210 relative to a second surface normal 2212 on the first wrapped core face 1604.

Figure 23:
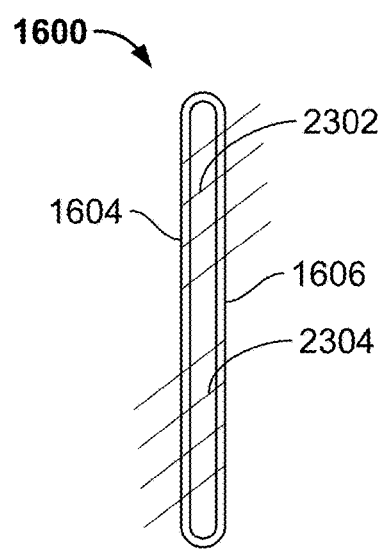
FIG. 23 schematically depicts a cross-sectional view of the wrapped foam core of FIG. 16 having a first set of pins injected into a first wrapped core face, and a second set of pins injected into a second wrapped core face, according to one or more aspects described herein.

FIG. 23 schematically depicts a cross-sectional view of the wrapped foam core 1600 having a first set of pins, of which pin 2302 is one example pin, injected into the first wrapped core face 1604, and a second set of pins, of which pin 2304 is one example pin, injected into the second wrapped core face 1606.

Figure 24:
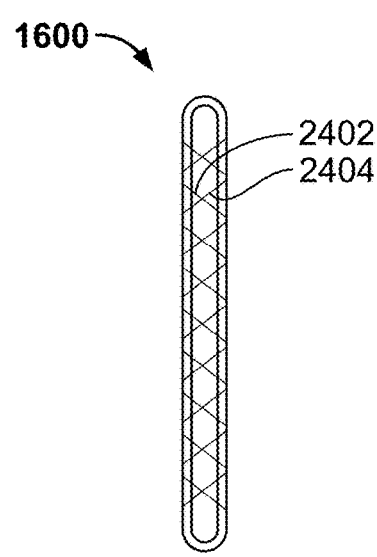
FIG. 24 schematically depicts a cross-sectional view of the wrapped foam core of FIG. 16 having multiple pins injected into the foam core at angles resulting in an overlapping pattern of pins, according to one or more aspects described herein.

FIG. 24 schematically depicts a cross-sectional view of the wrapped foam core 1600 having multiple pins, of which pins 2402 and 2404 are example pins, injected into the foam core 1600 at angles resulting in an overlapping pattern of pins, as depicted FIG. 24.

Figure 25A:
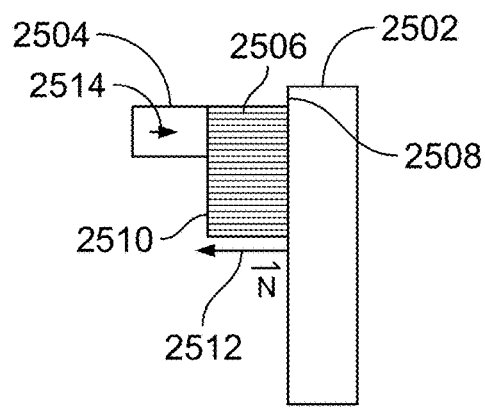
FIGS. 25A-25C schematically depict one implementation of a method for injecting multiple pins into a foam core, according to one or more aspects described herein.
Figure 25B:
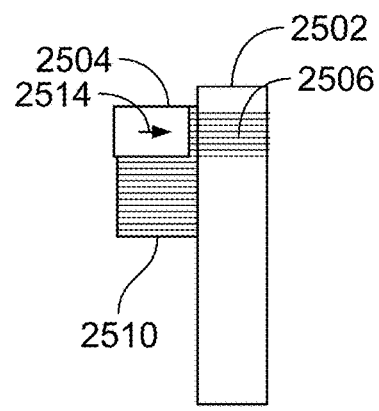
Figure 25C:
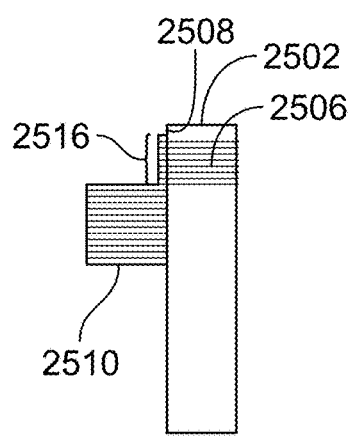

FIGS. 25A, 25B, and 25C schematically depict one implementation of a method for injecting multiple pins into a foam core. In particular, FIG. 25A schematically depicts a foam core 2502. This foam core 2502 may represent a cross-sectional view of a hockey blade foam core, or a cross-sectional view of a portion of a hockey stick shaft, among others. Further, the foam core 2502 may be similar to the unwrapped foam core 100, or may be wrapped with one or more layers of carbon fiber tape, similar to the wrapped foam core 1600, without departing from the scope of these disclosures. Pin injector 2504 may be utilized to urge one or more pins into the foam core 2502 during one or more manufacturing processes. Accordingly, the pin injector 2504 may be configured to apply a pressure to one or more pins, of which pin 2506 is one example pin, resulting in the one or more pins piercing the foam core face 2508, and translating into the foam core 2502. In one example, the pin injector 2504 may comprise a manually-operated, or an automated device. Further, the pin injector 2504 may comprise a hydraulic, pneumatic, or screw-driven actuator, among others. It is contemplated that various actuator types (linear actuators, among others) may be utilized in the pin injector 2504, without departing from the scope of these disclosures. In another example, the pin injector 2504 may comprise an ultrasonic hammer. It is also contemplated that additional or alternative apparatuses and/or methods may be utilized to urge one or more pins (e.g. pin 2506) into the foam core 2502, and may be utilized without departing from the scope of the disclosures described herein.

In one example, a set of one or more pins (e.g. pin 2506) may be retained within a guide foam structure 2510 prior to injection of the set of one or more pins into the foam core 2502. As such, the guide foam structure 2510 may loosely retain the one or more pins 2506 at a desired angle relative to the injection surface (foam core face 2508) on the foam core 2502. In the depicted example of FIG. 25A, the pins 2506 may be loosely retained within the guide foam structure 2510 at an angle of approximately 0° relative to a surface normal 2512 of the foam core face 2508.

In one implementation, the guide foam structure 2510 may be loosely positioned proximate the injection surface (e.g. foam core face 2508) of the foam core 2502. In another implementation, the guide foam structure 2510 may be coupled to the injection surface (e.g. foam core face 2508). The guide foam structure 2510 may be coupled using one or more adhesives, and/or mechanical coupling elements. It is contemplated that any coupling methodology may be utilized, without departing from the scope of these disclosures.

FIG. 25B schematically depicts the pin injector 2504 urging a set of pins, of which pin 2506 is one example pin, into the foam core 2502. Accordingly, the pin injector 2504 may be configured to urge the pins into the foam core 2502 by translating along the direction indicated by arrow 2514. During injection of the pins 2506, the guide foam structure 2510 may be deformed by the pin injector 2514. FIG. 25C schematically depicts the guide foam structure 2510 following the removal of the pin injector 2504, and shows the deformed area 2516 of the guide foam structure 2510 following injection of the pins (e.g. pin 2506) into the foam core 2502. In one example, the pin injector 2504 may inject all pins retained within the guide foam structure 2510 with a single injection pass/actuation. In another example, and as schematically described in FIGS. 25A-25C, pin injector 2504 may utilize multiple injection passes to inject all of the pins retained within the guide foam structure 2510. In one implementation, following injection of the pins from the guide foam structure 2510, a subset of one or more pins, in addition to a mass of deformed guide foam, may remain coupled to the foam core face 2508. This remaining material may be removed by one or more cutting, abrasive, or chemical processes, among others. In another example, the guide foam structure 2510 may be configured to degrade and disintegrate after a predetermined amount of time, and/or after deformation during one or more pin injection processes, and/or upon being exposed to air, water, and/or another solvent.

Figure 26A:
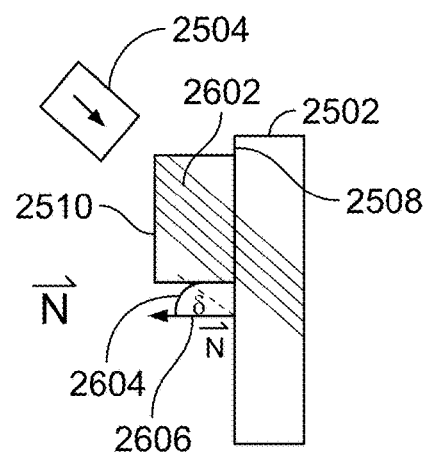

FIGS. 26A-26C schematically depict another implementation of a method for injecting multiple pins into a foam core at a non-zero angle relative to an injection surface. Similar to the description of FIGS. 25A-25C, a guide foam structure 2510 may be utilized to loosely-retain a group of pins, of which pin 2602 is one example pin, at a non-zero angle δ 2604 relative to a surface normal 2606 of the injection surface (foam core surface 2508). In one example, angle δ 2604 may have a range of 5°-85°, 10°-80°, 15°-75°, 20°-70°, 25°-65°, 30°-60°, 35°-55°, 40°-50°, or approximately 45°, among others.

As schematically depicted in FIG. 26B, the pin injector 2504 may be configured to urge the pins 2602 into the foam core 2502 by translating in a direction 2608 approximately parallel to a longitudinal length of pins 2602. However, alternative pin injector geometries and translation paths may be utilized, without departing from the scope of these disclosures. Similar to FIG. 25C, FIG. 26C schematically depicts the deformed guide foam structure 2510 following injection of the one or more pins into the foam core 2502, and removal of the pin injector 2504.

In another implementation, one or more pins may be injected into the foam core 2502 without using a guide foam structure 2510. FIGS. 27A and 27B schematically depict a pin injector 2702 that may be utilized to inject pins into a foam core 2502, without using a guide foam structure. In one example, one or more pins, of which pin 2704 is one example pin, may be loaded into the pin injector 2702, and the pin injector 2702 may be positioned proximate an injection surface, such as foam core face 2508. An injection angle (e.g. an angle ε 2706 relative to a surface normal 2708) may be adjustable by the pin injector 2702. Further, the pin injector 2702 may utilize any actuation technology in order to urge the pins 2704 into the foam core 2502. FIG. 27B schematically depicts the pen injector 2702 following injection of a first set of pins, including pin 2704, into the foam core 2502. The pin injector 2702 may be automatically or manually reloaded with a second set of pins, including exemplary pin 2710, as depicted.

Figure 28:
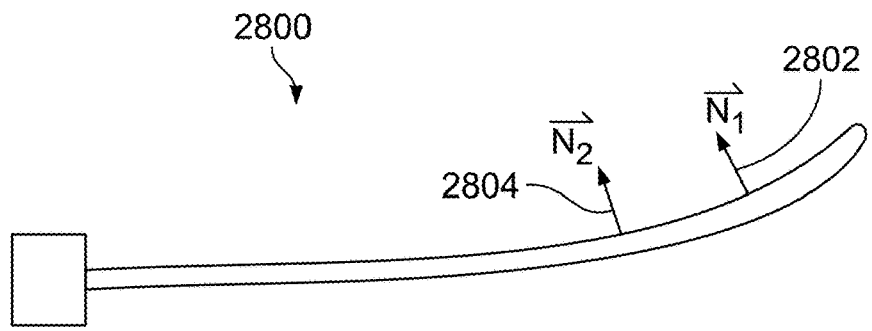
FIG. 28 schematically depicts a plan view of a hockey stick blade, according to one or more aspects described herein.

Throughout this disclosure, reference is made to surface normals on one or more surfaces of a hockey stick structure (e.g. one or more surfaces of a foam core 100, or a wrapped foam core 1600 of a hockey stick blade). FIG. 28 schematically depicts a plan view of a hockey stick blade 2800. As depicted in FIG. 28, it will be understood that a hockey stick blade may include complex curvature, such that a first surface normal 2802 may not be parallel to a second surface normal 2804. Accordingly, in one implementation, multiple pins may be injected at an angle relative to a single surface normal (e.g. the first surface normal 2802), which may correspond to the point of injection of a single pin within a group of pins, or may not correspond to any of the points of injection of the pins within a group of pins, but may be a surface normal of an approximate center of an area into which a group of pins is to be injected. In one example, a group of pins injected into a foam core (e.g. foam core 100 and/or foam core 1600), may be approximately parallel to one another. Further, it is noted that the complex curvature of, among others, a hockey stick blade is three-dimensional. As such, three-dimensional coordinate systems (e.g. spherical coordinate system) may be utilized to define the angles discussed in the various disclosures described herein, and without departing from the scope of the aforementioned disclosures.

Following injection of one or more pins into a foam core, such as foam core 100 or wrapped foam core 1600, one or more additional layers of carbon fiber tape may be wrapped around the foam core to produce a preform structure. In particular, the additional layers of carbon fiber tape may be preimpregnated with epoxy resin.

The preform structure may be added to a mold, which urges it into a desired shape (e.g. a desired curve of a hockey stick blade). The preform, within the mold, may then be heated to a temperature at or above the melting point of the resin within the preform (e.g. resin preimpregnated into the carbon tape of the preform structure). Upon cooling, the resin solidifies, and maintains the shape of the mold upon extraction from the mold (e.g. maintains the desired hockey blade curvature).

Figure 29:
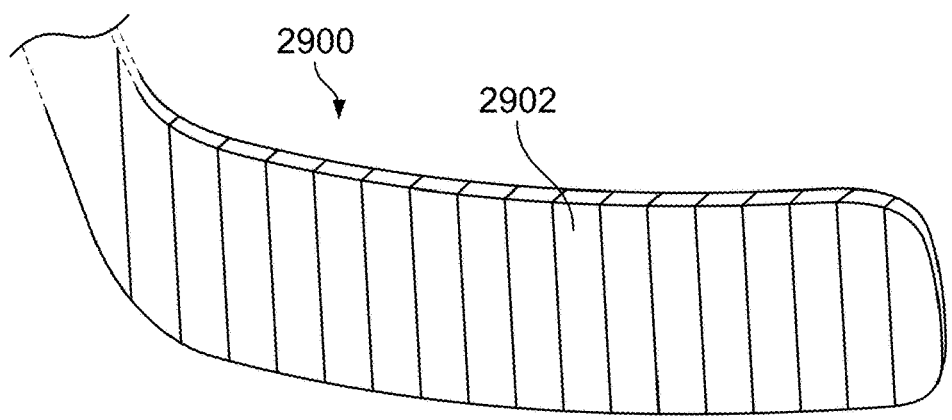
FIG. 29 schematically depicts a first preform structure comprising one or more layers of carbon fiber tape wrapped around a pin-injected foam core, according to one or more aspects described herein.
Figure 30:
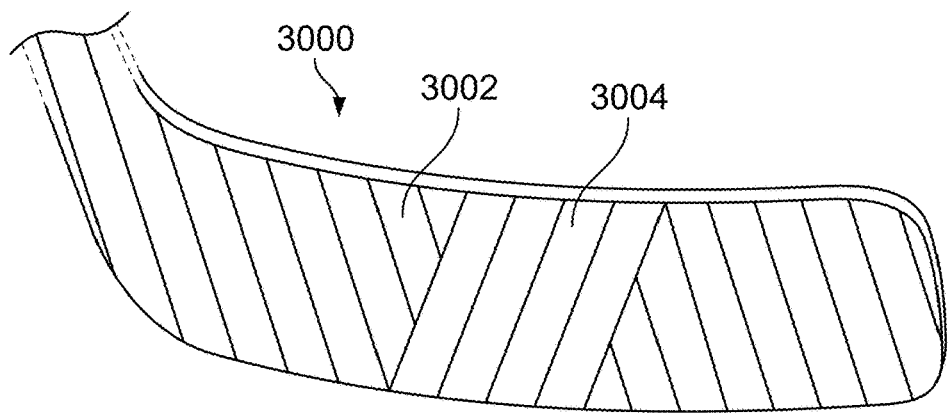
FIG. 30 schematically depicts a partially-complete second preform structure, according to one or more aspects described herein.

FIG. 29 schematically depicts a first preform structure 2900 comprising one or more layers of carbon fiber tape wrapped around the pin-injected foam core 100 or 1600. Similar to the carbon fiber tape 1602 of the wrapped foam core 1600, the carbon fiber tape added after injection of the pins may be continuously wrapped. However, in another implementation, the carbon fiber tape may be wrapped using multiple discontinuous lengths of tape. It is contemplated that any pattern for wrapping the carbon fiber tape around a pin-injected foam core may be utilized. FIG. 29 schematically depicts a first wrapping pattern, whereby one or more layers of carbon fiber tape 2902 are wrapped with approximately vertical wrappings. FIG. 30 schematically depicts a partially-complete second preform structure 3000. In this alternative implementation, one or more layers of carbon fiber tape may be added onto the foam core 100 or foam core 1600 using diagonal wrappings. As such, wrappings 3002 may represent a first layer added to the foam core 100 or foam core 1600, and wrappings 3004 may represent a partially-complete second layer added on top of the first layer 3002.

Figure 31:
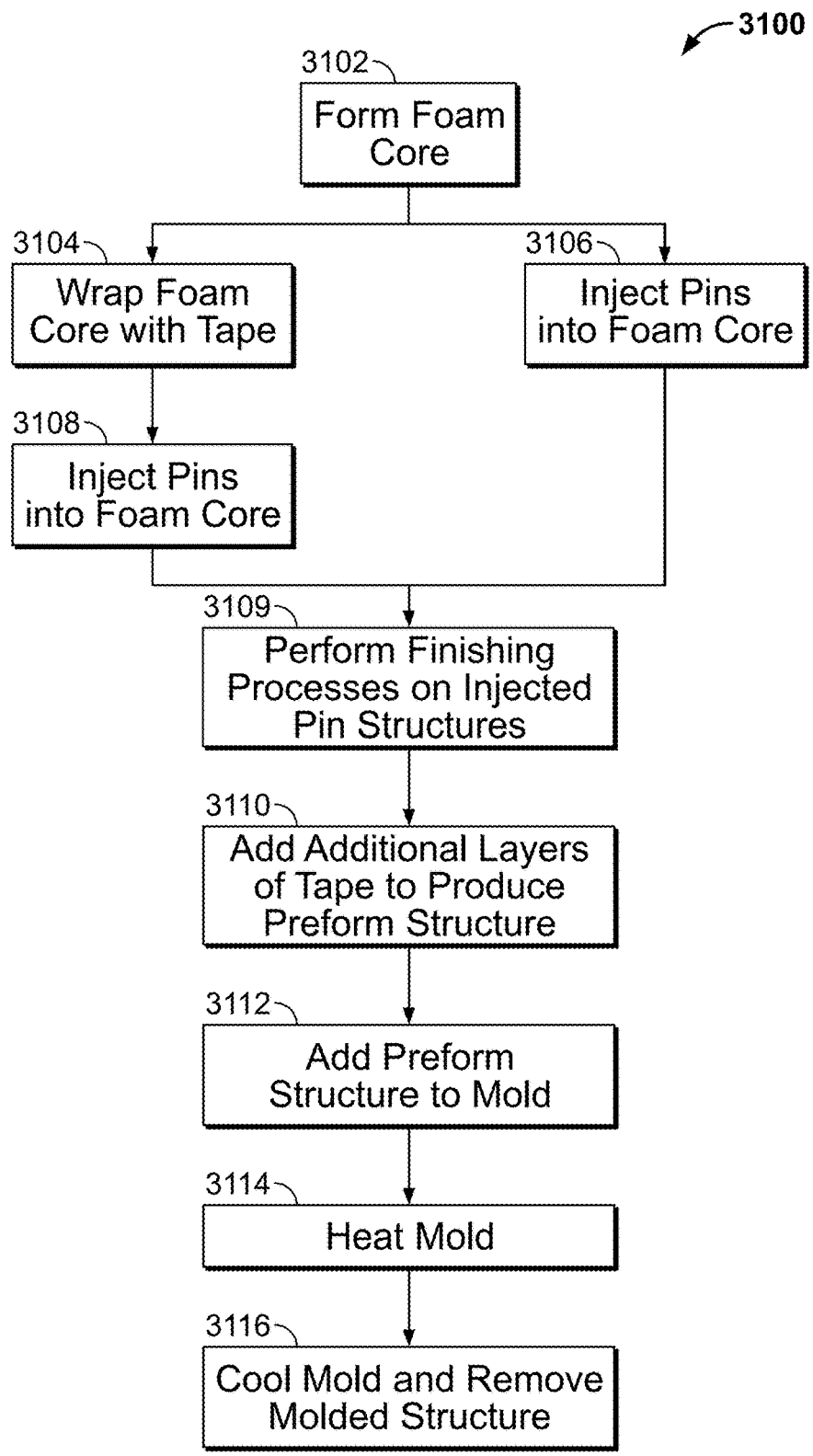
FIG. 31 is a flowchart diagram 3100 of a process for forming a pin-reinforced molded structure, according to one or more aspects described herein.

FIG. 31 is a flowchart diagram 3100 of a process for forming a pin-reinforced molded structure. The processes described in relation to flowchart diagram 3100 may be utilized to produce a molded hockey stick blade structure, or hockey stick shaft structure, among others. In one example, a foam core may be formed by one or more manufacturing processes. It is contemplated that any suitable manufacturing processes may be utilized to form a foam core, without departing from the scope of these disclosures. These manufacturing processes may include molding (injection molding or otherwise), cutting, stamping, or milling, among many others. The foam core may have a structure resembling that of a hockey stick blade without its desired, final curvature (e.g. the foam core may be symmetrical, such that it does not yet have a curvature designed for a right- or left-handed player). The foam core may be similar to foam core 100, as previously described. In another example, the foam core may have a structure of a hockey stick shaft, among others. In one implementation, one or more manufacturing processes to form the foam core may be executed at block 3102 of flowchart 3100.

In one implementation, prior to injecting one or more pins, one or more layers of tape may be added to the foam core. As previously described, the tape may be carbon fiber tape, and may be preimpregnated with resin. In another example, the described resin may additionally or alternatively include one or more thermoset or thermoplastic materials, include polyurethane (PU), Nylon, or polypropylene (PP), among others. In one implementation, the one or more layers of tape may be manually or mechanically added to the foam core to produce a wrapped foam core, similar to wrapped foam core 1600. These one or more processes executed to add one or more layers of tape to the foam core prior to injection of one or more pins may be executed at block 3104 of flowchart 3100. Subsequently, one or more pins may be injected into the wrapped foam core according to one or more of the processes described in relation to FIGS. 17-27. These one or more processes to inject one or more pins into the wrapped foam core may be executed at block 3108 of flowchart 3100.

Alternatively, one or more pins may be injected into the unwrapped foam core. As such, one or more pins may be injected into the foam core in a manner similar to one or more of those described in relation to FIGS. 7-15 and 25-27. These one or more processes executed to inject one or more pins into the foam core may be executed at block 3106 of flowchart 3100.

One or more finishing processes may be used to prepare one or more of the outer surfaces of the foam core 100, or wrapped foam core 1600, for additional layers of tape. These one or more finishing processes may include one or more cutting and/or grinding/sanding operations to remove, in one example, portions of the injected pins protruding out from the surfaces of the foam core 100, or wrapped foam core 1600 (e.g. as described in relation to FIGS. 10, 11, 14, 19, 20, and 23). Additionally or alternatively, one or more finishing processes may remove the deformed guide foam structure from the injection surface of the foam core 100, or wrapped foam core 1600. These one or more processes may be executed at block 3109 of flowchart 3100.

Following injection of one or more pins into the foam core, one or more additional layers of tape may be added to produce a preform structure. The additional layers of tape may be preimpregnated with resin, and may be wrapped in a manner similar to those described in relation to FIGS. 29 and 30. Further, it is contemplated that the additional layers of tape may be manually or mechanically wrapped, without departing from the scope of these disclosures. As such, the one or more processes to wrap additional layers of tape onto the pin-injected foam core may be executed at block 3110. It is contemplated, however, that the processes described in relation to flowchart 3100 may not utilize block 3110 such that additional layers of tape may not be added to the foam core, without departing from the scope of these disclosures.

The preform structure produced by adding the additional layers of preimpregnated tape onto the foam core may be positioned within a mold structure. It is contemplated that the mold structure may be configured to urge the preform structure into any desired shape, without departing from the scope of these disclosures. In one specific example, the mold may have a geometry of a desired hockey blade curvature. One or more automated or manual processes to add the preform structure to a mold may be executed at block 3112 of flowchart 3100. Subsequently, the mold structure may be heated equal to or above one or more melting temperatures of the resin within the preimpregnated tape and/or resin pre-applied to the pins prior to injection. Upon melting, the resin may form new adhesive bonds between the internal elements of the preform structure. In one example, if the injected pins are not pre-coated with resin, resin may selectively flow across the pins and adhesively bond the pins to the foam core of the preform structure. In one implementation, the mold may be heated at block 3114 of flowchart 3100. In another implementation, it is contemplated that the resin described in relation to flowchart 3100 may melt and form new adhesive bonds, but may not flow when heated (e.g. the epoxy may not be configured to flow across the pins structures). In another example, epoxy that is pre-coated onto pins may remain partially or fully solid when heated, and may bond to resin within the preimpregnated tape.

It is contemplated that any heating temperature and duration may be utilized, without departing from the scope of these disclosures. Further, any heating technology may be utilized, without departing from the scope of these disclosures. Following a heating period, the mold may be passively or actively cooled. As such, upon re-solidification, the resin may retain the geometry of the mold cavity (i.e., retain the desired geometry of the hockey blade, among others). Advantageously, the resin that may coat and bond the injected pins to the surrounding foam core structure and fiber layers may add additional strength and rigidity to the hockey blade structure, once molded. In particular, the injected pins may be utilized to connect the composite structures of the carbon fiber tape that forms the walls (e.g. the outer surfaces) of the hockey blade structure, once molded. As such, once molded, the pins may serve as structural bridging elements between the outer contact surfaces of the hockey stick blade, thereby providing enhanced reinforcement to the blade structure.

One or more mechanical or automated processes configured to passively or actively cool the mold, and/or remove the molded structure, may be executed at block 3116 of flowchart 3100.

It is also contemplated that a resin transfer molding (RTM) technique could be employed in the formation of the hockey blade structure. In this example, the pins can be applied to a core and then wrapped with a dry fiber material or the pins can be applied to a core already wrapped with a dry fiber. The pins applied to a wrapped foam core may also help to maintain the fibers onto the blade. Once the preform is constructed, a liquid thermoset resin can be used to saturate the dry fiber preform placed in a mold to form the blade.

Figure 32:
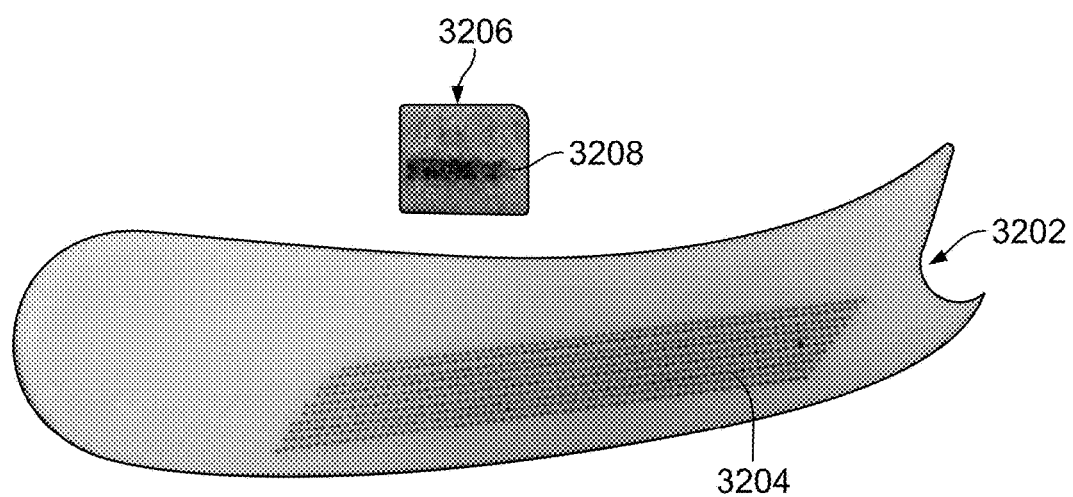
FIG. 32 depicts an example of a form core hockey blade structure, according to one or more aspects described herein.
Figure 33:
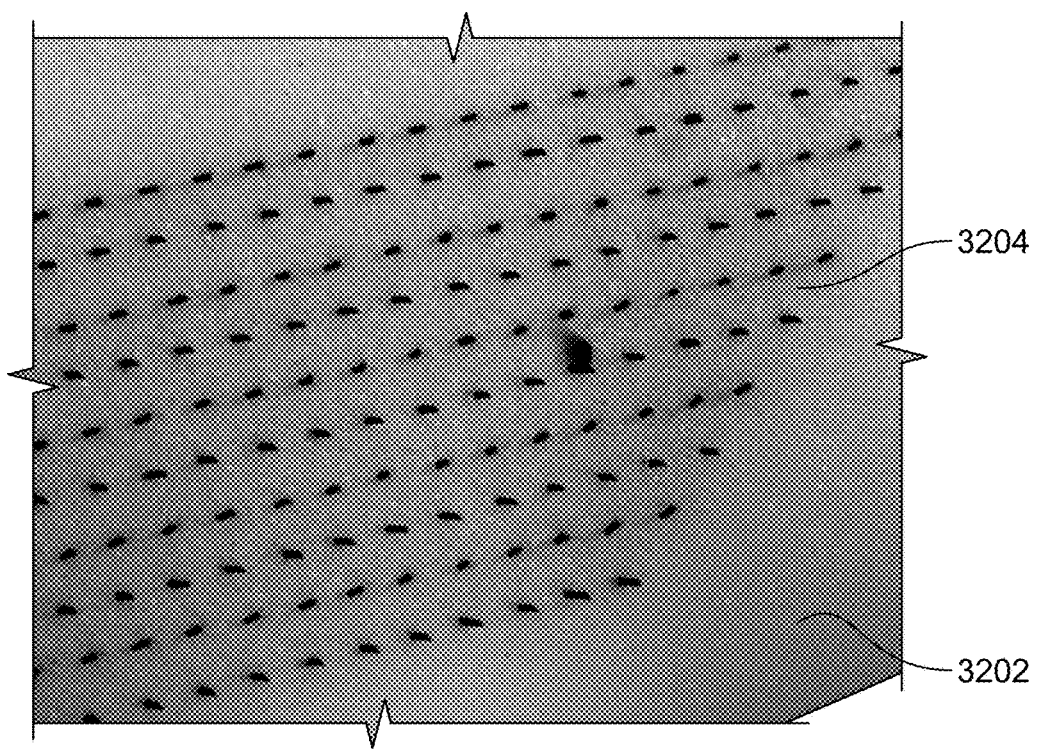
FIG. 33 depicts a close-up view of the foam core hockey blade structure of FIG. 32, according to one or more aspects described herein.

FIG. 32 depicts an example of a foam core hockey blade structure 3202, similar to the foam core 100 depicted in FIG. 2. In particular, FIG. 32 depicts an array of fiber pins 3204 injected into the foam core 3202. In one example, the fiber pins may be similar to pins 202. FIG. 32 also depicts a guide foam structure 3206. A plurality of fiber pins 3208 are held within the guide foam structure 3206 prior to injection into the foam core 3202. As such, the guide foam structure 3206 may be similar to guide foam structure 2510. FIG. 33 depicts a close-up view of the foam core hockey blade structure 3202 of FIG. 32, including a close-up view of a portion of the array of fiber pins 3204.

In one example, a formed hockey blade structure may be fabricated using a method that utilizes a fiber-pin-reinforced foam core. The method may include forming a foam core with a first core face, a second core face, a top core edge, and a bottom core edge. A group of fiber pins may be injected into the first core face, with the group of fiber pins extending between the first core face and the second core face. Further, a first fiber pin, from the group of fiber pins, may be injected at a first angle relative to surface normal of the first core face at a first point of injection of the first fiber pin. A second fiber pin, from the group of fiber pins, may be injected at a second angle relative to a surface normal of the first core face at a second point of injection of the second fiber pin. The foam core may be wrapped with a layer of fiber tape that extends along the first core face, the top core edge, the second core face, and the bottom core edge of the foam core. As such, the wrapped core may have a first wrapped face, a second wrapped face, a top wrapped edge, and a bottom wrapped edge. The wrapped foam core may be placed in a mold, and the mold. Then cooled before removing a formed hockey blade structure from the mold.

The method of fabricating the formed hockey blade structure may include spacing the fiber pins apart from one another at regular or irregular intervals on the first core face. Further, the method of fabricating the formed hockey blade structure may inject the group of fiber pins into the first core face with a first spacing density, and inject a second group of fiber pins into the first core face with a second spacing density.

In one example, one or more of the first angle and the second angle at which the first fiber pin and second fiber pin are injected into the first core face may be approximately equal to 0°, or may range between 15° and 75°. In another example, the first angle and the second angle at which the first fiber pin and the second fiber pin are injected into the first core face may not be equal to one another. In yet another example, the first fiber pin and the second fiber pin may be approximately parallel to one another.

The group of fiber pins injected into the foam core may be constructed from carbon fiber or may be constructed from a resin-coated carbon fiber structure. The coating resin may, in one example, be epoxy. However, in another example, when pins are injected into the foam core using a guide foam structure and an ultrasonic tool (e.g. ultrasonic hammer 2504), a high temperature resin may be utilized. In one specific example, a bis-maleimide (BMI) resin may be utilized to coat the pins prior to injection. Further, the group of fiber pins injected into the foam core may be discrete, or disconnected from one another. In other implementations, pins injected into the foam core, as described throughout this disclosure, may be constructed from glass, aramid fiber, metal, ceramic, or combination thereof without departing from the scope of these disclosures.

The fiber tape that is wrapped around the foam core may be preimpregnated with resin, and may be continuously wrapped, or may include multiple, discontinuous pieces.

In one example, the method of fabricating the fiber-pin-reinforced foam core may inject the group of fiber pins through the foam core after is has been wrapped with a first layer of fiber tape, such that the group of fiber pins extend through the foam core and out through the second wrapped face of the wrapped core. A second layer of fiber tape may be wrapped around the foam core after the plurality of fiber pins are injected through the first wrapped face.

An ultrasonic hammer may be utilized to inject the group of fiber pins into the foam core. Additionally, a guide foam structure may be positioned adjacent to the first core face prior to injecting the group of fiber pins. The guide foam may be utilized to retain at least a portion of the group of fiber pins prior to injecting the fiber pins into the foam core.

In another example, a hockey blade structure may be formed by a method that includes forming a foam core, with a first core face, a second core face, a top core edge, and a bottom core edge. A group of discrete fiber pins may be injected into the first core face, with the group of discrete fiber pins extending between the first core face and the second core face. Further, the foam core may be wrapped with a layer of fiber tape that extends along the first core face, the top core edge, the second core face, and the bottom core edge of the foam core to form a wrapped foam core with a first wrapped face, a second wrapped face, a top wrapped edge, and a bottom wrapped edge. The method may additionally include placing the wrapped foam core in a mold, heating the mold, cooling the mold, and removing a formed hockey blade structure from the mold.

One or more fiber pins, from the group of discrete fiber pins, may be injected at an angle relative to a surface normal of the first core face the point of injection of the one or more fiber pins. This angle may be approximately 0°, or may range between approximately 15 and 75°. Additionally, the fiber pins may be injected into a first area of the foam core with a first spacing density, and a second group of discrete fiber pins may be injected into a second area of the first core face with a second spacing density. Further, the group of discrete fiber pins may be constructed from carbon fiber, aramid fiber, glass, metal, or ceramic, or combinations thereof.

In another example, a method may include forming a foam core, injecting a group of pins structures through at least one surface of the foam core, wrapping the foam core with a layer of fiber tape to form a preform, placing the preform in a mold, heating and cooling the mold, and removing a formed structure from the mold. Further, the plurality of pin structures may be constructed from carbon fibers. Additionally, the formed structure may be a hockey blade, or a hockey stick shaft.

In yet another example, a hockey stick blade apparatus may include a molded preform structure that's has a foam core with a first core face, a second core face, a top core edge, and the bottom core edge. The molded preform structure may also have a group of discrete fiber pins that extent between the first core face and the second core face within the foam core. A layer of fiber tape me extend along the first core face, the top core edge, the second core face, and the bottom core edge of the foam core.

Additionally, the layer of fiber tape utilized by the hockey stick blade apparatus may be preimpregnated with resin prior to molding of the molded preform structure. Further, the group of discrete fiber pins utilized within the hockey blade apparatus may be regularly spaced apart from one another.

In one implementation, the group of discrete fiber pins includes a first sub-group of pins injected into the foam core with a first pin density, and a second sub-group of pins injected into the foam core with a second pin density.

The present disclosure is disclosed above and in the accompanying drawings with reference to a variety of examples. The purpose served by the disclosure, however, is to provide examples of the various features and concepts related to the disclosure, not to limit the scope of the invention. One skilled in the relevant art will recognize that numerous variations and modifications may be made to the examples described above without departing from the scope of the present disclosure.

We claim:

1. A hockey blade structure formed by a method comprising the steps of:
    forming a foam core, the foam core comprising a first core face, a second core face, a top core edge, and a bottom core edge;
    injecting a first plurality of discrete pins with a first spacing density into a first area the first core face, the first plurality of discrete pins extending between the first core face and the second core face;
    injecting a second plurality of discrete pins with a second spacing density less than the first spacing density into a second area of the first core face, the second plurality of discrete pins extending between the first core face and the second core face;
    wrapping the foam core with a layer of fiber tape to form a wrapped core, the layer of fiber tape extending along the first core face, the top core edge, the second core face, and the bottom core edge of the foam core, wherein the wrapped core has a first wrapped face, a second wrapped face, a top wrapped edge, and a bottom wrapped edge; and
    molding the wrapped foam core in a mold.

2. The hockey blade structure of claim 1, wherein a selected pin, from the first plurality and the second plurality of discrete pins, is injected at an angle relative to a surface normal of the first core face at a point of injection of a first fiber pin.

3. The hockey blade structure of claim 2, wherein the angle is approximately zero degrees.

4. The hockey blade structure of claim 2, wherein the angle is between approximately 15 and 75 degrees.

5. The hockey blade structure of claim 1, wherein the first plurality and the second plurality of discrete pins comprise epoxy-coated carbon fiber pins.

6. The hockey blade structure of claim 1, wherein the plurality of discrete pins comprise metallic pins.

\* \* \* \* \*